US011247631B2

(12) United States Patent
Kakimoto

(10) Patent No.: US 11,247,631 B2
(45) Date of Patent: Feb. 15, 2022

(54) HEAD PROTECTING AIRBAG DEVICE

(71) Applicant: TOYODA GOSEI CO., LTD., Kiyosu (JP)

(72) Inventor: Kenji Kakimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 197 days.

(21) Appl. No.: 16/448,409

(22) Filed: Jun. 21, 2019

(65) Prior Publication Data

US 2019/0389419 A1  Dec. 26, 2019

(30) Foreign Application Priority Data

Jun. 25, 2018  (JP) .............................. JP2018-120178

(51) Int. Cl.
*B60R 21/232* (2011.01)
*B60R 21/231* (2011.01)
*B60R 21/213* (2011.01)

(52) U.S. Cl.
CPC .......... *B60R 21/232* (2013.01); *B60R 21/213* (2013.01); *B60R 21/23138* (2013.01)

(58) Field of Classification Search
CPC ............ B60R 21/232; B60R 21/23138; B60R 21/213
See application file for complete search history.

(56) References Cited

U.S. PATENT DOCUMENTS

| 6,460,879 | B2 * | 10/2002 | Tanase | ................... | B60R 21/213 |
| | | | | | 280/730.2 |
| 7,246,817 | B2 * | 7/2007 | Tanase | ................ | B60R 13/0225 |
| | | | | | 280/728.3 |
| 2002/0017775 | A1 * | 2/2002 | Tanase | ................... | B60R 21/232 |
| | | | | | 280/730.2 |
| 2012/0025500 | A1 * | 2/2012 | Yamamura | ............ | B60R 21/232 |
| | | | | | 280/730.2 |

(Continued)

FOREIGN PATENT DOCUMENTS

| JP | 2012-240649 A | 12/2012 |
| JP | 2013-010378 A | 1/2013 |

(Continued)

OTHER PUBLICATIONS

Japanese Office Action dated May 25, 2021, issued in corresponding Japanese Patent Application No. 2018-120178 (and English Machine Translation).

*Primary Examiner* — Karen Beck
(74) *Attorney, Agent, or Firm* — Posz Law Group, PLC

(57) ABSTRACT

A head protecting airbag device is adapted to be mounted on a vehicle provided with an assist grip that is mounted on an upper edge of a window by front and rear attachment portions. An airbag includes a gas inflow portion which is inflatable with an inflation gas and a non-inflow portion which admits no inflation gas. The gas inflow portion includes a shielding portion which covers an area of the window below the assist grip. The non-inflow portion includes a thickness regulating portion which regulates the (Continued)

thickness of the shielding portion when the airbag is inflated. In the shielding portion, the thickness regulating portion is disposed on a front upper portion of the shielding portion below the front attachment portion of the assist grip, and is not disposed below the rear attachment portion of the assist grip.

2 Claims, 7 Drawing Sheets

(56) References Cited

U.S. PATENT DOCUMENTS

| | | |
|---|---|---|
| 2012/0299275 A1 | 11/2012 | Saimura et al. |
| 2016/0001732 A1 | 1/2016 | Asada et al. |
| 2017/0282842 A1 | 10/2017 | Okuhara et al. |

FOREIGN PATENT DOCUMENTS

| | | | | |
|---|---|---|---|---|
| JP | 5201089 B2 * | 6/2013 | ........... | B60R 21/232 |
| JP | 2014-054868 A | 3/2014 | | |
| JP | 2017-177977 A | 10/2017 | | |
| WO | WO-2011108101 A1 * | 9/2011 | ........... | B60R 21/213 |
| WO | 2014/132810 A1 | 9/2014 | | |
| WO | WO-2014132513 A1 * | 9/2014 | ........... | B60R 21/232 |

* cited by examiner

HEAD PROTECTING AIRBAG DEVICE

The present application claims priority from Japanese Patent Application No. 2018-120178 of Kakimoto, filed on Jun. 25, 2018, the entire disclosure of which is incorporated herein by reference.

BACKGROUND OF THE INVENTION

Field of the Invention

The present disclosure relates to a head protecting airbag device including an airbag that is folded and accommodated on an upper edge side of a window on an intra-vehicle side of a vehicle along a front-rear direction, is unfolded and inflated downward when inflation gas flows thereinto, and covers an intra-vehicle side of the window.

Description of Related Art

In a head protecting airbag device according to the related art, as disclosed in JP 2013-10378 A, an airbag is folded and accommodated on an upper edge side of a window on an intra-vehicle side of a vehicle along a front-rear direction, is unfolded and inflated downward when inflation gas flows thereinto, covers the intra-vehicle side of the vehicle, and also covers the intra-vehicle side of the window in an area below an assist grip. As front and rear attachment portions are attached to a vehicle body side on the upper edge side of the window, the assist grip is disposed on the upper edge side of the window on a front upper side of a seated vehicle occupant.

However, in the head protecting airbag device according to the related art, when the occupant is shifted to the front side or the upper side, a head may approach a front portion of the assist grip depending on arrangement of the assist grip. At this time, when the airbag is unfolded and inflated, a position of the airbag is regulated by the assist grip, and the airbag may strongly interfere with the head. In particular, attachment portions attached to the vehicle body side are disposed on front and rear sides of the assist grip. Thus, when the upper edge side of the window is inclined to the front lower side, the front attachment portion of the assist grip is disposed lower than the rear attachment portion. Therefore, the airbag strongly and easily interferes with the approaching head in the vicinity of the front attachment portion of the assist grip.

SUMMARY OF THE INVENTION

In order to solve the above-described problems, an aspect of the present disclosure is to provide a head protecting airbag device which can suppress strong interference of an airbag with an occupant's head near the front side of an assist grip when the airbag is inflated.

The head protecting airbag device according to the present disclosure includes an airbag that is folded and accommodated on an upper edge side of a window on an intra-vehicle side of a vehicle along a front-rear direction, that is unfolded and inflated downward to protect a head of an occupant when inflation gas flows thereinto, and that covers an intra-vehicle side of the window. The vehicle is provided with an assist grip that is disposed above a front seat in the upper edge of the window. The assist grip is mounted on a vehicle body by front and rear attachment portions. The airbag includes a gas inflow portion that causes the inflation gas to flow into the airbag and is inflated to separate an intra-vehicle side wall portion and an extra-vehicle side wall portion from each other, and a non-inflow portion that is configured to couple the intra-vehicle side wall portion and the extra-vehicle side wall portion to each other and prevents the inflow of the inflation gas. The gas inflow portion includes a shielding and inflating portion that covers an area of the window below the assist grip. The non-inflow portion includes a peripheral portion surrounding a periphery of the gas inflow portion and a thickness regulating closing portion that regulates a thickness of the shielding and inflating portion when the airbag is inflated. The shielding and inflating portion is configured such that, in the area below the assist grip, the thickness regulating closing portion is disposed on an upper portion side of the shielding and inflating portion separated from a lower edge side of the peripheral portion below the front attachment portion and does not extend rearward not to be provided below the rear attachment portion.

In the head protecting airbag device according to the present disclosure, the shielding and inflating portion disposed in an area below the assist grip in the airbag is provided with the thickness regulating closing portion on an upper portion side of the shielding and inflating portion below the front attachment portion of the assist grip. Since the inflation thickness dimension, that is, the inflated volume, is regulated, even when the occupant's head is disposed in the vicinity of an area directly below a front portion side of the assist grip, strong interference of the airbag with the occupant's head can be suppressed. Further, the thickness regulating closing portion disposed below the front attachment portion does not extend directly below the rear attachment portion of the assist grip. Since the thickness regulating closing portion is not disposed at all, in an area below the assist grip in the shielding and inflating portion, the inflation can be completed while a constant thickness dimension is maintained as a whole, and the head of the occupant moving in an outboard direction can be smoothly received and protected.

Therefore, in the head protecting airbag device according to the present disclosure, strong interference of the airbag with the occupant's head when the airbag is inflated near the front side of the assist grip can be suppressed. Further, it is possible to smoothly receive and protect the head of the occupant in the normal position, which does not approach the front portion side of the assist grip, by the airbag which has been completely inflated.

Further, in the head protecting airbag device according to the present disclosure, it is desired that the shielding and inflating portion of the airbag is configured such that, in the area below the assist grip, a maximum thickness portion shifts upward from an area below the front attachment portion of the assist grip towards the area below the rear attachment portion, when inflated.

In such a configuration, as the thickness dimension is obtained within a certain range while the volume at the time of the inflation is secured, the shielding and inflating portion of the airbag which is completely inflated can be smoothly inflated in a plate shape from the lower side of the front attachment portion to the lower side of the rear attachment portion in the area below the assist grip, so that the head of the occupant can be stably received.

In this case, in the head protecting airbag device according to the present disclosure, it is desired that the shielding and inflating portion includes a second thickness regulating closing portion in a lower portion in the area below the rear attachment portion of the assist grip. The second thickness regulating closing portion should be disposed at a distant from the lower edge side of the peripheral portion such that an inflatable portion is provided on a lower side thereof.

In such a configuration, the inflated portion can be disposed on the lower edge side of the shielding and inflating portion on the lower side of the second thickness regulating closing portion, so that a substantial occupant reception area of the occupant's head can be enlarged.

Further, in the head protecting airbag device according to the present disclosure, the shielding and inflating portion of the airbag is configured such that inflation thickness dimensions of the inflated portion below the front attachment portion and the inflated portion below the rear attachment portion of the assist grip may be equal to each other.

In such a configuration, the shielding and inflating portion of the airbag can be inflated in a plate shape having a certain thickness dimension substantially over the entire area below the assist grip, so that the head of the occupant can be more stably received.

Further, in the head protecting airbag device according to the present disclosure, the airbag is configured such that a connection port portion connected to an inflator for causing the inflation gas to flow into the airbag is disposed on an upper edge side of a substantially central portion of the airbag in the front-rear direction and above a rear edge side of the shielding and inflating portion on a rear side of the assist grip.

In such a configuration, the area below the assist grip in the airbag is an area on an upstream side of the inflation gas. When the inflation gas initially flows into the airbag, the airbag is thickly and easily inflated. When there is no measure, the airbag strongly interferes with the head of the occupant disposed near the front attachment portion of the assist grip. As described above, when the predetermined thickness regulating closing portion is disposed, the strong interference can be reliably suppressed.

DESCRIPTION OF THE PREFERRED EMBODIMENTS

Preferred embodiments of the invention are described below with reference to accompanying drawings. However, the invention is not limited to the embodiments disclosed herein. All modifications within the appended claims and equivalents relative thereto are intended to be encompassed in the scope of the claims.

Figure 1:
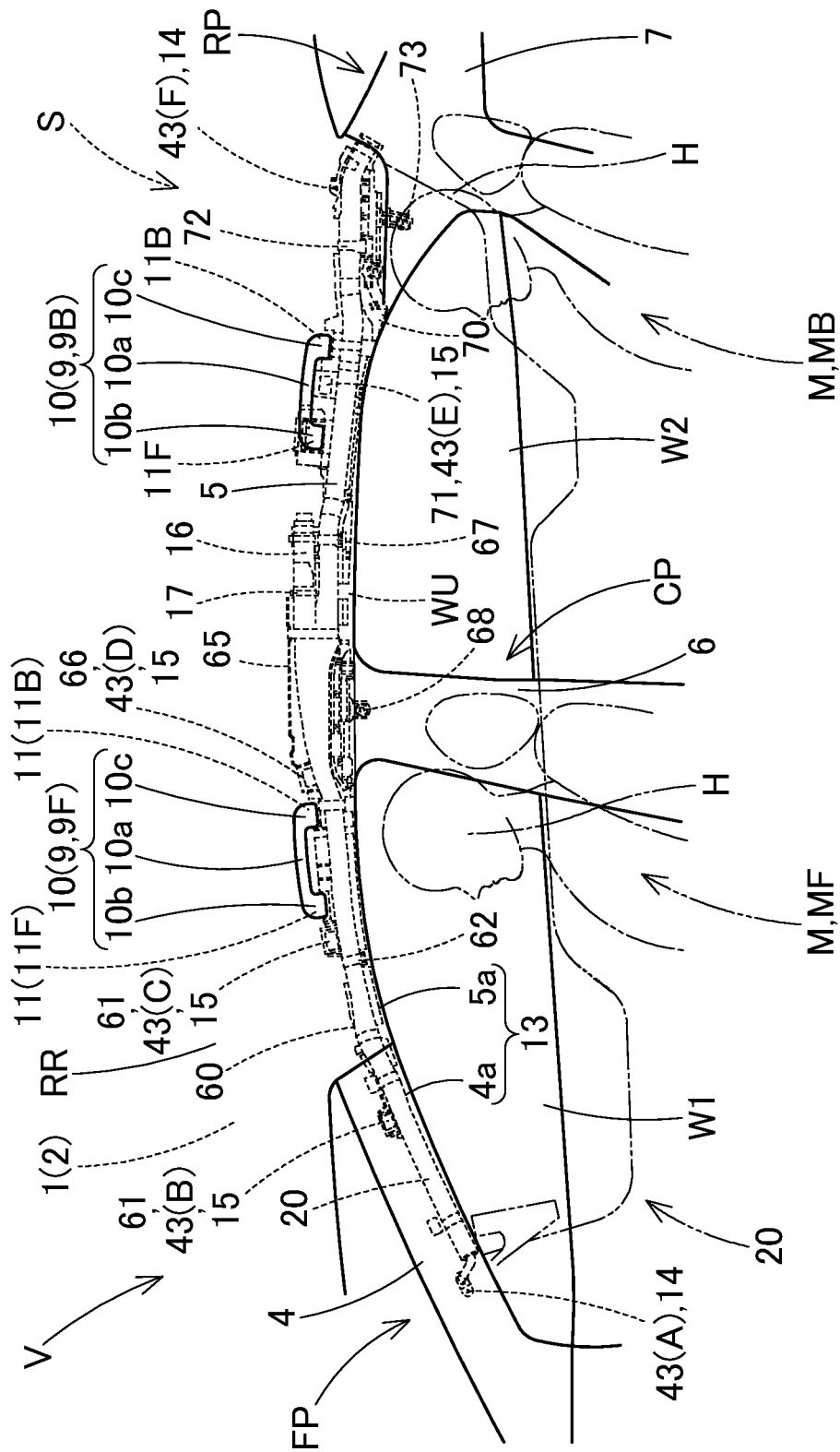
FIG. 1 is a schematic front view showing a head protecting airbag device according to an embodiment of the present disclosure when viewed from an intra-vehicle side.

As shown in FIG. 1, a head protecting airbag device S according to an embodiment is mounted on a double row seat type vehicle V having front and rear two windows (side windows) W1 and W2. The head protecting airbag device S includes an airbag 20, an inflator 16, an airbag cover 13, and synthetic resin cases 60, 65, and 70 for accommodating the folded airbag 20. The airbag 20 is folded and accommodated from a lower edge side of a front pillar portion FP via a lower edge side of a roof side rail portion RR to an upper area of a rear pillar portion RP on upper edge WU sides of the windows W1 and W2 on an intra-vehicle side of the vehicle V.

Assist grips 9F and 9B are disposed on the upper edge WU sides of the windows W1 and W2 of the vehicle V, respectively. In the assist grips 9, front and rear attachment portions 11F and 11B are fixed to an inner panel 2, and horizontal rod-like gripping body portions 10a of gripping portions 10, gripped by occupants MF and MB, are assembled with and disposed in the attachment portions 11F and 11B such that front and rear ends 10b and 10c can rotate toward the intra-vehicle side (see FIGS. 1 and 4). Further, in the front assist grip 9F, the roof side rail portion RR on the upper edge WU side of the window W1 is inclined toward the front lower side, and the front attachment portion 11F is disposed below the rear attachment portion 11B.

As shown in FIG. 1, the airbag cover 13 includes lower edges 4a and 5a of a front pillar garnish 4 disposed in the front pillar portion FP and a roof head lining 5 disposed in the roof side rail portion RR. The front pillar garnish 4 and the roof head lining 5 are made of synthetic resin and are fixedly attached to an intra-vehicle side of the inner panel 2 on the body (a vehicle body) 1 side in the front pillar portion FP and the roof side rail portion RR. Further, the airbag cover 13 covers an intra-vehicle side of the folded and accommodated airbag 20 and is pushed by the airbag 20 to be opened to the intra-vehicle side in order to cause the airbag 20, when being unfolded and inflated, to protrude toward a lower side of the intra-vehicle side (see FIGS. 4 and 5).

The inflator 16 supplies inflation gas to the airbag 20, is a substantially cylindrical cylinder type, and has a not-shown gas discharge port, which can discharge the inflation gas, on a tip end side thereof. The inflator 16 inserts a tip end side including the vicinity of the gas discharge port into a connection port portion 24 of the airbag 20, which will be described below, and is connected to the airbag 20 using a clamp 17 disposed on an outer peripheral side of the connection port portion 24. The inflator 16 is attached to a position above the window W2 of the inner panel 2 using a not-shown predetermined attachment bracket. Further, the inflator 16 is electrically connected to a not-shown control device of the vehicle V through a not-shown lead wire, and is operated by receiving an operation signal from the control device when the control device detects side collision, oblique collision, or rollover of the vehicle V.

Figure 2:
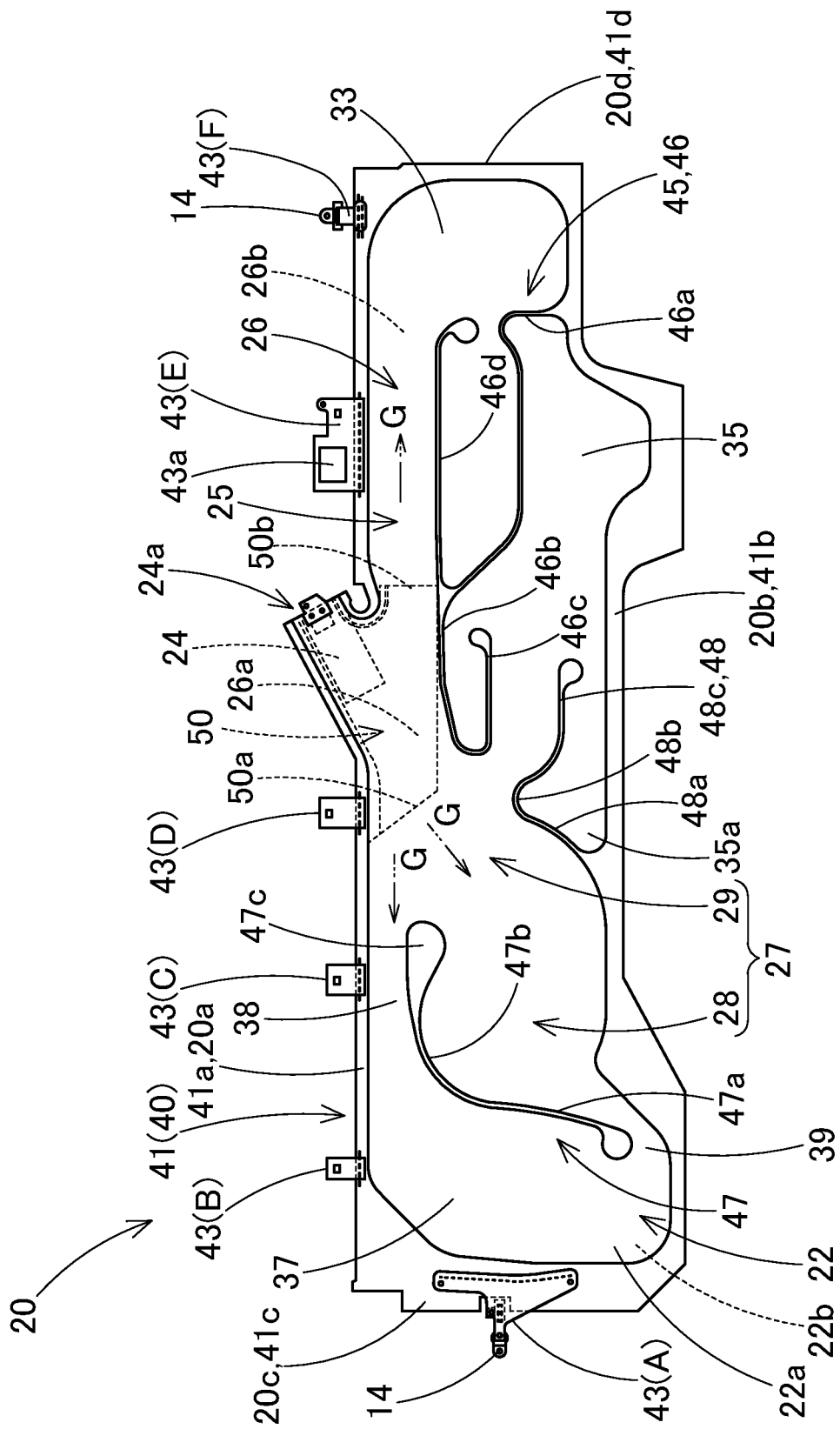
FIG. 2 is a front view showing a state in which an airbag according to the embodiment is flatly unfolded.

As shown in FIG. 2, the airbag 20 includes a gas inflow portion 22 which causes inflation gas G to flow into the airbag 20 and thus can be inflated to separate an intra-vehicle side wall portion 22a and an extra-vehicle side wall portion 22b from each other, and a non-inflow portion 40 which couples the intra-vehicle side wall portion 22a and the extra-vehicle side wall portion 22b to each other to prevent the inflow of the inflation gas G.

The gas inflow portion 22 includes an unfolding and inflating portion 25 which is unfolded and inflated from a folded state to cover intra-vehicle sides I of the windows W1 and W2 (see FIG. 5), and the connection port portion 24 which protrudes upward from the vicinity of a central portion of an upper edge 20a of the airbag 20 in a front-rear direction, to be connected to the inflator 16. The unfolding and inflating portion 25 includes a gas supplying passage portion 26 which is disposed in the upper edge 20a of the airbag 20 and supplies the inflation gas G from the connection port portion 24 to front and rear sides, a shielding and inflating portion 27 which covers the intra-vehicle side I of the front window W1, a shielding and inflating portion 33 which covers the intra-vehicle sides I of the rear window W2 and the rear pillar portion RP, a shielding and inflating portion 35 which covers the intra-vehicle sides I of a center pillar CP and a front portion of the window W2, and a shielding and inflating portion 37 disposed on a front end side.

Thus, at a time of the side collision of the vehicle V, a head H of the occupant MF seated in a front seat at a normal position is received and protected by the shielding and inflating portion 27 that covers the intra-vehicle side I of the front window W1. The shielding and inflating portion 37 on the end side receives and protects the head H of the occupant MF, which moves forward toward the extra-vehicle side at a time of offset collision of the vehicle V. Further, the shielding and inflating portion 33 receives a head H of the rear occupant MB, and the shielding and inflating portion 35 mainly receives and protects the head H of the rear occupant MB at the time of the offset collision.

Further, in the case of the embodiment, an inner tube 50 branching in a forked shape is disposed inside the connection port portion 24. The inflation gas G flowing from an opening 24a side into the connection port portion 24 flows from front and rear openings 50a and 50b on a lower end side of the inner tube 50 to a front side of a front end 26a and a rear end 26b side of the gas supplying passage portion 26, and flows to the front and rear shielding and inflating portions 27 and 33.

The non-inflow portion 40 includes a peripheral portion 41 which is disposed in an outer periphery of the gas inflow portion 22, and a thickness regulating closing portion 45 which is disposed in the unfolding and inflating portion 25 below the connection port portion 24 so as to regulate the thickness of the unfolding and inflating portion 25. In the non-inflow portion 40, the intra-vehicle side wall portion 22a and the extra-vehicle side wall portion 22b are coupled together. The peripheral portion 41 is provided with a plurality of attachment portions 43 (43A, 43B, 43C, 43D, 43E, and 43F) for attachment to the upper edge WU of the windows W1 and W2.

The peripheral portion 41, which surrounds the periphery of the gas inflow portion 22, includes an upper edge 41a, a lower edge 41b, a front edge 41c, and a rear edge 41d corresponding to an upper edge 20a, a lower edge 20b, a front edge 20c, and a rear edge 20d of the airbag 20. Thus, the five attachment portions 43 (43B, 43C, 43D, 43E, and 43F) are disposed on the upper edge 41a side, and the belt-like attachment portion 43A extending forward is disposed on the front edge 20c side. The attachment portion 43F on the rear edge 20d side also has a belt shape extending upward. Ring-shaped attachment brackets 14 made of sheet metal are disposed on these attachment portions 43A and 43F. The attachment brackets 14 are attached and fixed to the inner panel 2 on the upper edge WU sides of the windows W1 and W2 through not-shown bolts, respectively. The other attachment portions 43B, 43C, 43D, and 43E are provided with synthetic resin clips 15 (see FIG. 1) attached to the inner panel 2 on the upper edge WU sides of the windows W1 and W2, and are attached and fixed to the inner panel 2 using the clips 15 together with assembly seats 61, 66, and 71 of the cases 60, 65, and 70.

The attachment portion 43E is provided with a fitting hole 43a locked to the front attachment portion 11F of the rear assist grip 9B, positional deviation of the attachment portion 43E is regulated by attaching and fixing the clip 15 and even by locking the front attachment portion 11F, and thus the attachment portion 43E is fixed to the inner panel 2.

The thickness regulating closing portion 45 includes a central closing portion 46 that partitions the rear shielding and inflating portion 33 and the central shielding and inflating portion 35 directly below the gas supplying passage portion 26, a front closing portion 47 that partitions the front shielding and inflating portion 27 and the shielding and inflating portion 37 on a front end side, and a lower closing portion 48 extending upward from the lower edge 41b side of the peripheral portion 41 to mutually partition the shielding and inflating portions 27 and 35.

The central closing portion 46 includes a vertical rod portion 46a curvedly extending upward from a rear portion side of the lower edge 41b of the peripheral portion 41 to partition the shielding and inflating portions 33 and 35 in the front-rear direction, and a front horizontal rod portion 46b and a rear horizontal rod portion 46d extending forward and rearward from an upper end of the vertical rod portion 46a to partition a lower edge side of the gas supplying passage portion 26. The front horizontal rod portion 46b includes a reverse portion 46c extending rearward and downward to enter the shielding and inflating portion 35 side on a front end side.

The front closing portion 47 includes a vertical rod portion 47a extending substantially vertically between the upper edge 41a and the lower edge 41b separated from the upper edge 41a and the lower edge 41b of the peripheral portion 41, and a horizontal rod portion 47b curvedly extending rearward from an upper end side of the vertical rod portion 47a. The horizontal rod portion 47b is formed in a semicircular shape that is wide in a vertical direction toward the rear end 47c side. When the airbag 20 mounted on the vehicle is completely inflated, the rear end 47c is disposed in an area directly below the front attachment portion 11F of the assist grip 9F.

An upper inlet portion 38 through which the inflation gas G flows into the shielding and inflating portion 37 is formed between the horizontal rod portion 47b of the front closing portion 47 and the upper edge 41a of the peripheral portion 41, and a lower inlet portion 39 through which the inflation gas G flows into the shielding and inflating portion 37 is formed between the vertical rod portion 47a of the front closing portion 47 and the lower edge 41b of the peripheral portion 41.

The lower closing portion 48 includes a raised portion 48a extending obliquely rearward and upward from the lower edge 41b side of the peripheral portion 41, an upper end portion 48b curved rearward and downward from an upper end of the raised portion 48a in a curved shape, and a rearward extension portion 48c extending rearward from a rear end of the upper end portion 48b substantially in a linear shape to enter the shielding and inflating portion 35. When the airbag 20 mounted on the vehicle is completely inflated, an area from the raised portion 48a to the upper end portion 48b is disposed in an area below the rear attachment portion 11B of the assist grip 9F. Therefore, when the airbag 20 is completely inflated, a front lower portion 35a of the shielding and inflating portion 35 as an inflatable portion is disposed between the raised portion 48a and the lower edge 41b of the peripheral portion 41 on a lower edge side of the shielding and inflating portion 27 below the rear attachment portion 11B of the assist grip 9F (see FIGS. 3 and 4).

When the airbag 20 mounted on the vehicle is completely inflated, the reverse portion 46c of the central closing portion 46 on a front end side is disposed to be separated to the rear side from a portion directly below the rear attachment portion 11B of the assist grip 9F.

Figure 3:
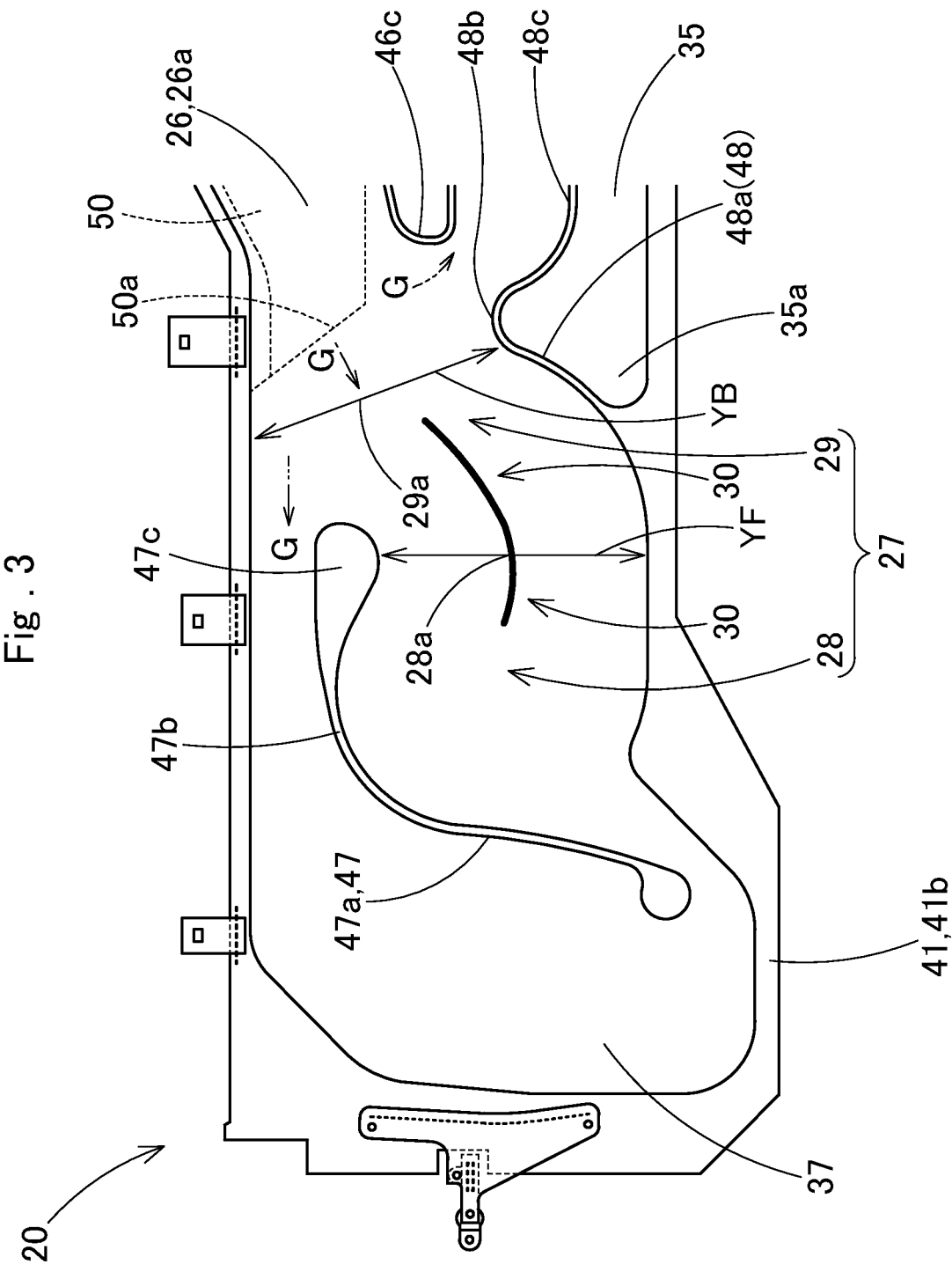
FIG. 3 is a partially enlarged front view showing a front portion side of the airbag according to the embodiment.
Figure 4:
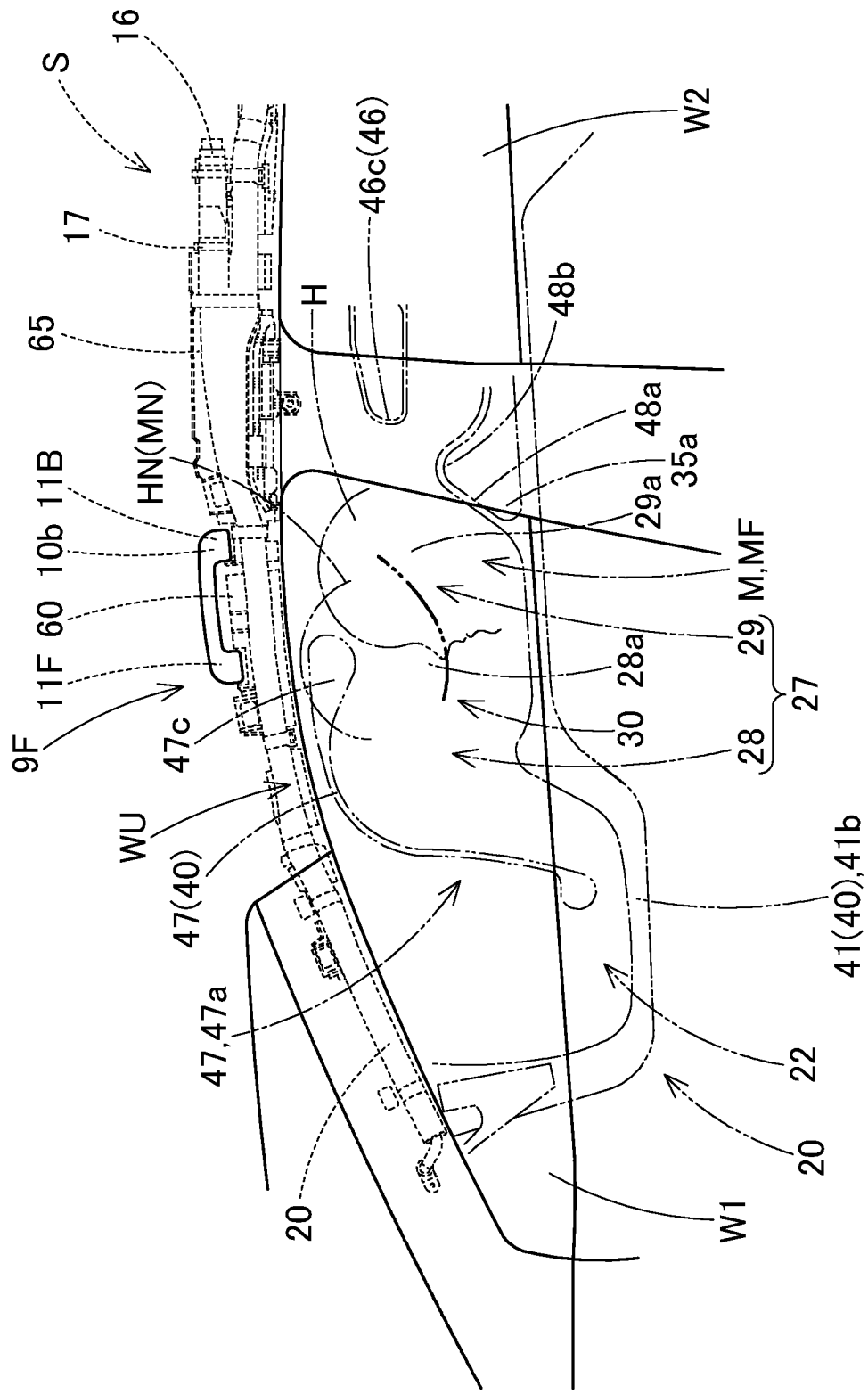
FIG. 4 is an enlarged front view showing the vicinity of a front window of the head protecting airbag device according to the embodiment.
Figure 5:
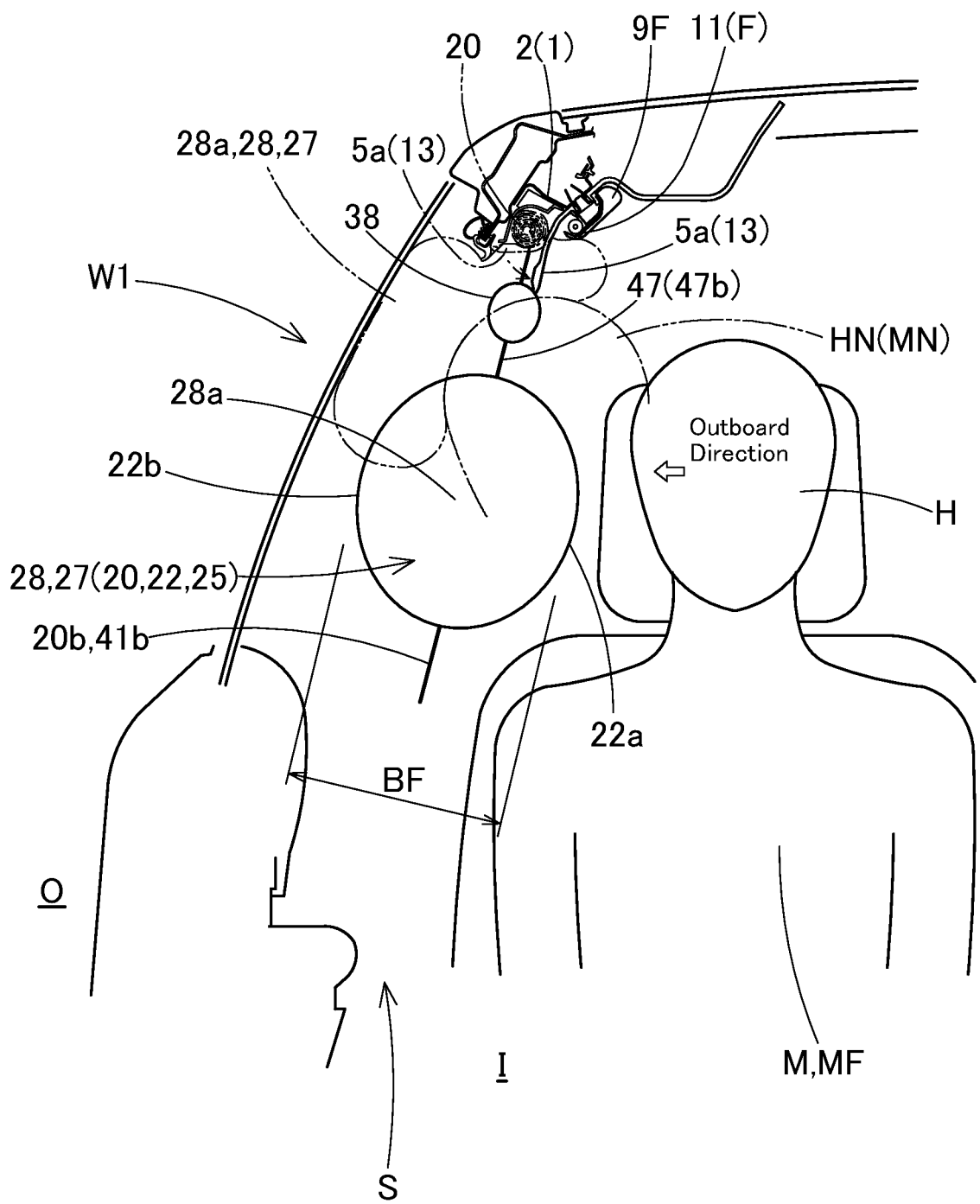
FIG. 5 is a schematic longitudinal sectional view showing the head protecting airbag device according to the embodiment when being operated.

In the case of the embodiment, the front shielding and inflating portion 27 of the airbag includes a front area 28 which is disposed below the horizontal rod portion 47b of the front closing portion 47, and a rear area 29 which is disposed at the rear of the front area 28 and above the lower closing portion 48. The front closing portion 47 is not disposed in the rear area 29. Thus, as shown in FIGS. 3 and 4, the inflation thickness dimension of a directly-below area 28a of the front area 28 directly below the front attachment portion 11F of the assist grip 9F, that is, the width dimension YF in a substantially vertical direction between the rear end 47c of the horizontal rod portion 47b and the lower edge 41b of the peripheral portion 41, and the inflation thickness dimension of a directly-below area 29a of the rear area 29 directly below the rear attachment portion 11B of the assist grip 9F, that is, the width dimension YB in a substantially vertical direction between the upper edge 41a of the peripheral portion 41 and the lower closing portion 48, are equal to each other. The thickness dimensions of the directly-below areas 28a and 29a when the airbag 20 is inflated are equal to each other.

Furthermore, the raised portion 48a of the lower closing portion 48 is gently raised upward, and a maximum thickness portion 30 of a portion extending from the front area 28 to the rear area 29 is set in a curved shape to be gently displaced upward toward the rear side.

When the head protecting airbag device S is mounted on the vehicle V, first, in a state in which the attachment brackets 14 are attached to the attachment portions 43A and 43F of the airbag 20, the airbag 20 is folded in a roll-folding manner or the like such that the lower edge 20b side approaches the upper edge 20a side. A tape for preventing a folding collapse is wound at a predetermined position. Next, the folded airbag 20 is accommodated in the cases 60, 65, and 70, and is attached to the cases 60, 65, and 70 by fastening bands 62, 67, and 68 of the cases 60, 65, and 70. Further, when the clips 15 are attached to assemble the attachment portions 43B, 43C, 43D, and 43E to the assembly seats 61, 66, and 71, the inflator 16 assembled with a not-shown attachment bracket is inserted into the connection port portion 24 of the airbag 20, and the inflator 16 is connected to the connection port portion 24 by the clamp 17, an airbag assembly can be formed. Thereafter, when the attachment brackets 14 are bolted to the inner panel 2, the clips 15 are fastened to the inner panel 2, attachment piece portions 68 and 73 of the cases 65 and 70 are bolted to the inner panel 2, and a not-shown attachment bracket assembled with the inflator 16 is bolted to the inner panel 2, the airbag assembly can be attached to the vehicle V. Thereafter, when a not-shown lead wire extending from a predetermined control device for operating the inflator 16 is connected to the inflator 16, the front pillar garnish 4 and the roof head lining 5 are attached to the inner panel 2 on the body 1 side, and the pillar garnishes 6 and 7 are attached to the inner panel 2 on the body 1 side, the head protecting airbag device S can be mounted on the vehicle V.

After the head protecting airbag device S is mounted on the vehicle V, when the inflator 16 is operated upon receiving an operation signal from the control device at the time of the side collision, the oblique collision, or the rollover of the vehicle V, the inflation gas G discharged from the inflator 16 flows to the gas supplying passage portion 26 through the connection port portion 24, and flows from the gas supplying passage portion 26 to the shielding and inflating portions 27, 33, 35, and 37. As indicated by a two-dot chain line of FIG. 1, the airbag 20 is largely inflated to cover the intra-vehicle sides I of the windows W1 and W2, the central pillar portion CP, and the rear pillar portion RP.

Then, in the head protecting airbag device S according to the embodiment, the shielding and inflating portion 27 disposed in an area below the assist grip 9F in the airbag 20 is provided with the front closing portion 47 as the thickness regulating closing portion 45 on an upper portion side of the shielding and inflating portion 27 below the front attachment portion 11F of the assist grip 9F. Since the inflation thickness dimension BF (see FIG. 5), that is, the inflated volume, is regulated, even when the occupant's head HN is disposed in the vicinity of an area directly below a front portion side of the assist grip 9F, as indicated by a two-dot chain line of FIG. 5, strong interference of the airbag 20 with the occupant's head NH can be suppressed. Further, the front closing portion 47 as the thickness regulating closing portion 45 disposed below the front attachment portion 11F does not extend directly below the rear attachment portion 11B of the assist grip 9F. Since the front closing portion 47 is not disposed at all, in an area below the assist grip 9F in the shielding and inflating portion 27, the inflation can be completed while a constant thickness dimension is maintained as a whole, and the head H of the occupant MF moving in an outboard direction (a direction toward the extra-vehicle side O) can be smoothly received and protected.

Therefore, in the head protecting airbag device S according to the embodiment, strong interference of the airbag 20 with the occupant's head NH when the airbag 20 is inflated near the front side of the assist grip 9F can be suppressed. Further, it is possible to smoothly receive and protect the head H of the occupant MF in the normal position, which does not approach the front portion side of the assist grip 9F, by the shielding and inflating portion 27 of the airbag 20 which has been completely inflated.

In particular, in the embodiment, in the assist grip 9F, the front attachment portion 11F is disposed below the rear attachment portion 11B in accordance with the forward and downward inclination of the upper edge WU of the window W1, and the airbag 20 is easy to strongly interfere with the occupant's head NH near the front attachment portion 11F. However, the inflation amount of the portion between the airbag 20 and the occupant's head NH is reduced by arranging the front closing portion 47, and thus the strong interference is smoothly suppressed.

Further, in the head protecting airbag device S according to the embodiment, the shielding and inflating portion 27 of the airbag 20 is configured to displace a center (a maximum thickness portion) 30 of the inflated portion to the upper side, from the lower side of the front attachment portion 11F to the lower side of the rear attachment portion 11B in an area below the assist grip 9F.

Therefore, in the embodiment, as the thickness dimension is easily contained within a certain range while the volume at the time of the inflation is secured, the shielding and inflating portion 27 of the airbag 20 which is completely inflated can be smoothly inflated in a plate shape from the lower side of the front attachment portion 11F to the lower side of the rear attachment portion 11B in the area below the assist grip 9F, so that the head H of the occupant MF can be stably received.

In particular, in the illustrated embodiment, the lower closing portion 48 is disposed in a lower portion of the shielding and inflating portion 27 in the area below the rear attachment portion 11B of the assist grip 9F, as a second thickness regulating closing portion. The lower closing portion 48 is disposed at a distant from the lower edge 41b side of the peripheral portion 41 such that the front lower portion 35a of the shielding and inflating portion 35 is provided there below.

Therefore, in the embodiment, the inflated portion, that is, the front lower portion 35a of the shielding and inflating portion 35 can be disposed on the lower edge side of the shielding and inflating portion 27 on the lower side of the lower closing portion 48 as the second thickness regulating closing portion, so that a substantial occupant reception area of the occupant's head H can be enlarged.

Further, in the head protecting airbag device S according to the embodiment, in the shielding and inflating portion 27 of the airbag 20, the inflation thickness dimension of an inflated portion (the directly-below area) 28a below the front attachment portion 11F and the inflation thickness dimension of an inflated portion (the directly-below area) 29a below the rear attachment portion 11B of the assist grip 9F are equal to each other. That is, in the embodiment, the width dimension YF in the substantially vertical direction between the rear end 47c of the horizontal rod portion 47b and the lower edge 41b of the peripheral portion 41, the width dimension YF setting the inflation thickness dimension of the directly-below area 28a, and the width dimension YB in the substantially vertical direction between the upper edge 41a of the peripheral portion 41 and the lower closing portion 48, the width dimension YB setting the inflation thickness dimension of the directly-below area 29a, are equal to each other, so that the thickness dimensions of the directly-below areas 28a and 29a at the time of the inflation are equal to each other.

Therefore, in the embodiment, the shielding and inflating portion 27 of the airbag 20 can be inflated in a plate shape having a certain thickness dimension substantially over the entire area below the assist grip 9F, so that the head H of the occupant MF can be more stably received.

When the thickness dimensions of the directly-below areas 28a and 29a at the time of the inflation are equal to each other, in addition to a case where the thickness dimensions of the two directly-below areas 28a and 29a are equal to each other, the thickness dimensions may be somewhat different from each other. In detail, a portion that partially largely protrudes is not provided in the front area 28 and the rear area 29 of the shielding and inflating portion 27, and the front area 28 and the rear area 29 may be completely inflated in a continuous plate having a substantially constant thickness.

Further, in the head protecting airbag device S according to the embodiment, in the airbag 20, the connection port portion 24 connected to the inflator 16 for introducing the inflation gas G is disposed on the upper edge 20a side of a substantially central portion in the front-rear direction and on the upper side of the rear edge side of the shielding and inflating portion 27 on the rear side of the assist grip 9F.

Therefore, in the embodiment, the area (the shielding and inflating portion) 27 below the assist grip 9F in the airbag 20 is an area on an upstream side of the inflation gas G. When the inflation gas G initially flows into the airbag 20, the airbag 20 is thickly and easily inflated. When there is no measure, the airbag 20 strongly interferes with the head NH of the occupant MN disposed near the front attachment portion 11F of the assist grip 9F. As described above, when the front closing portion 47 is disposed as the predetermined thickness regulating closing portion 45, the strong interference can be reliably suppressed.

Figure 6:
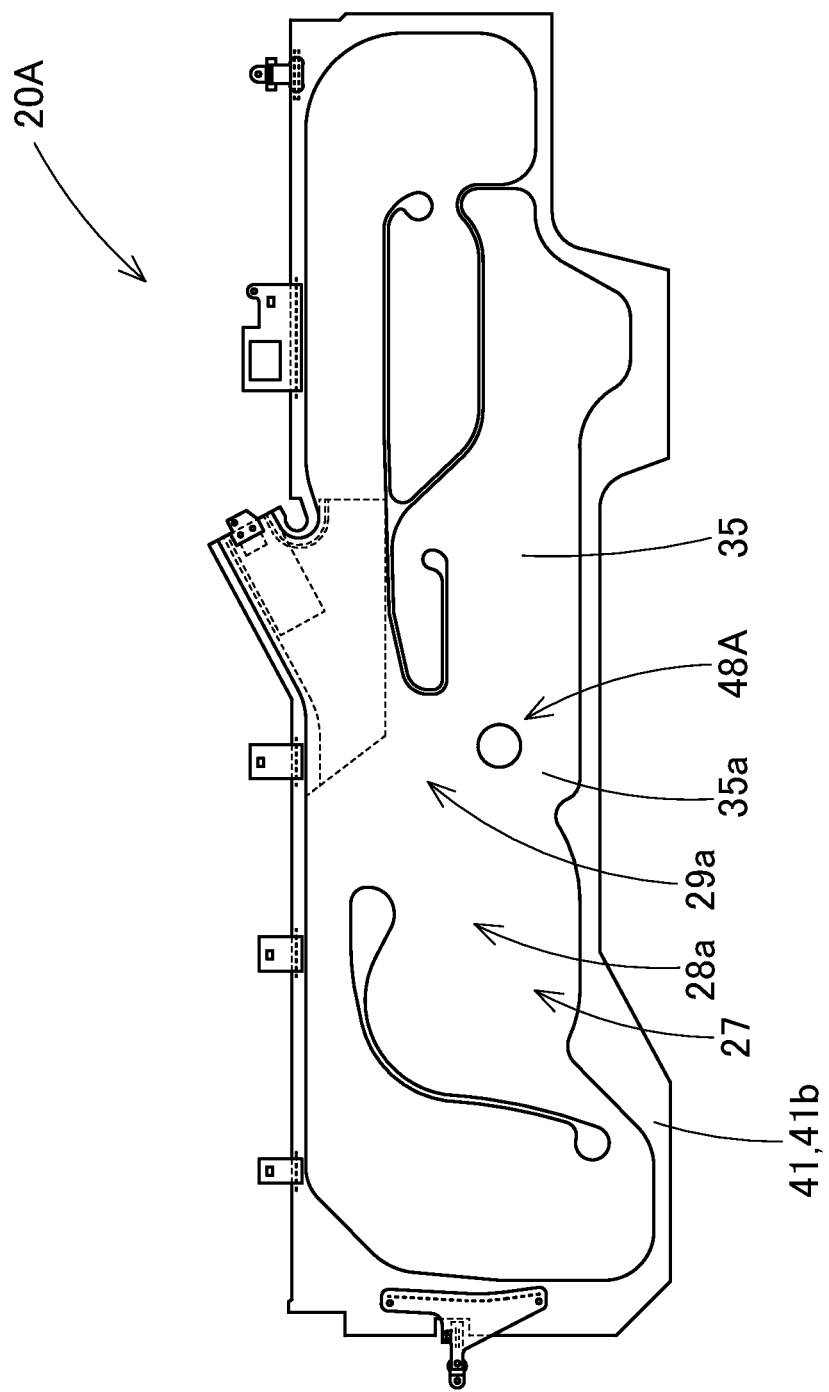
FIG. 6 is a front view showing an airbag according to a modification example of the embodiment.

In the airbag 20 according to the embodiment, the lower closing portion 48 having the raised portion 48a extending continuously obliquely upward and rearward from the lower edge 41b of the peripheral portion 41 is disposed as a structure in which the front lower portion 35a of the shielding and inflating portion 35 as an inflated portion is provided on a lower edge side of the shielding and inflating portion 27. However, like the airbag 20A shown in FIG. 6, the lower closing portion 48A separated from the lower edge 41b of the peripheral portion 41 may be provided, and the front lower portion 35a of the shielding and inflating portion 35 as the inflated portion may be provided on the lower edge side of the shielding and inflating portion 27.

Figure 7:
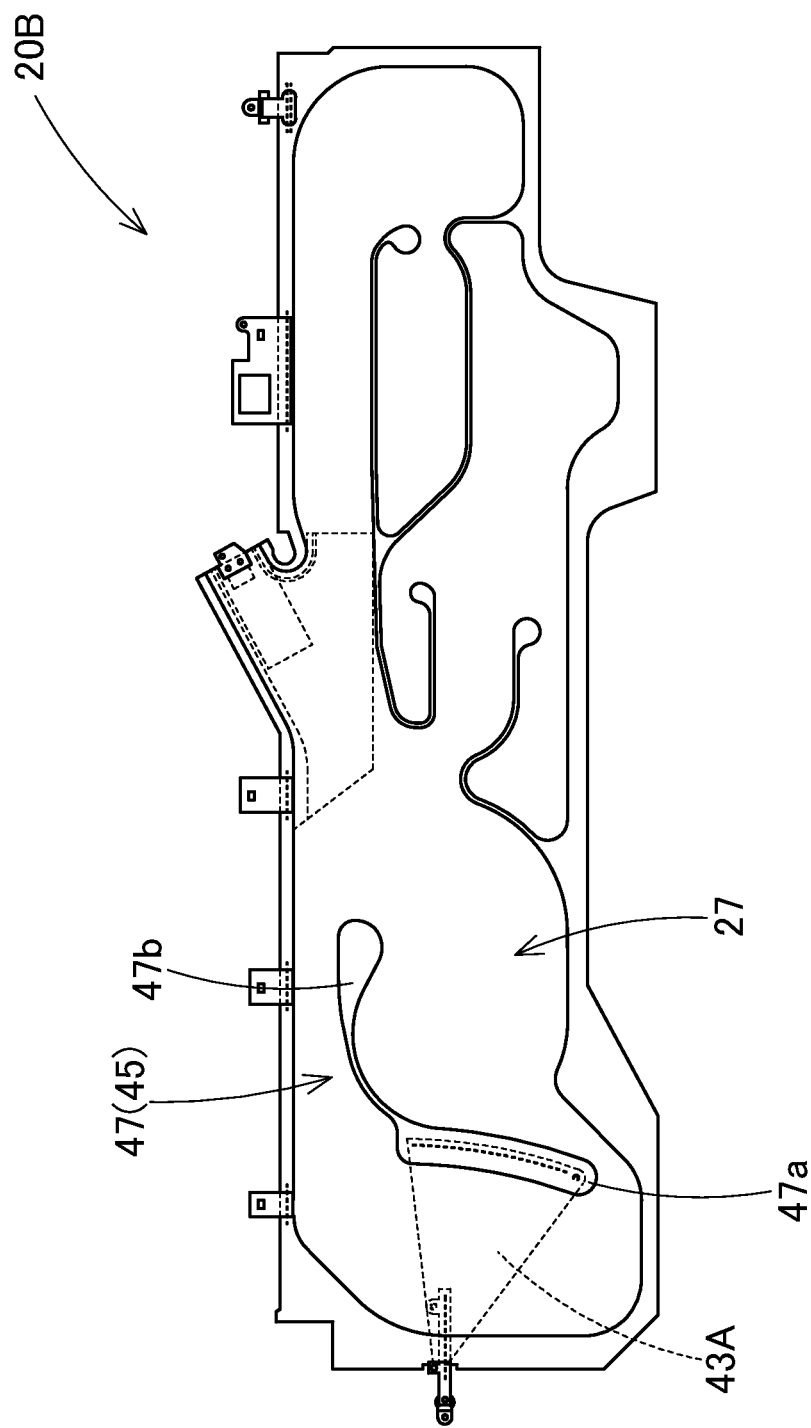
FIG. 7 is a front view showing the airbag according to another modification example of the embodiment.

Further, in the airbag 20 according to the embodiment, a case where the attachment portion 43A connected to the front pillar portion FP is disposed in the front edge 41c of the peripheral portion 41 to extend forward is shown. However, like the airbag 20B shown in FIG. 7, the attachment portion 43A connected to the front pillar portion FP may be attached to the vertical rod portion 47a of the front closing portion 47 to extend forward.

What is claimed is:

1. A head protecting airbag device adapted to be mounted on a vehicle which has a window and an assist grip that is disposed in an upper edge of the window above a front seat, the assist grip including a front attachment portion and a rear attachment portion each at front and rear portions thereof and being mounted on a vehicle body by the front and rear attachment portions,
 the airbag device comprising an airbag that is folded and accommodated on the upper edge of the window on an intra-vehicle side of the vehicle along a front-rear direction, the airbag being configured to unfold downward and be deployed over an intra-vehicle side of the window for protecting a head of a vehicle occupant when fed with an inflation gas,
 wherein the airbag includes:
 a gas inflow portion that is inflatable with the inflation gas such that an intra-vehicle side wall portion and an extra-vehicle side wall portion are separated from each other, the gas inflow portion including a shielding and inflating portion that covers an area of the window below the assist grip; and
 a non-inflow portion that is configured to couple the intra-vehicle side wall portion and the extra-vehicle side wall portion to each other and prevents the inflow of the inflation gas, the non-inflow portion including a peripheral portion that surrounds a periphery of the gas inflow portion, and a first thickness regulating closing portion that regulates a thickness of the shielding and inflating portion when the airbag is inflated,
 wherein the first thickness regulating closing portion is disposed in a front upper area of the shielding and inflating portion to be located below the front attachment portion of the assist grip when the airbag is mounted on the vehicle, distant from a lower edge side of the peripheral portion,
 wherein the first thickness regulating closing portion is not disposed in an area of the shielding and inflating portion to be located below the rear attachment portion of the assist grip,
 wherein the shielding and inflating portion of the airbag is configured such that, when inflated, a maximum thickness portion shifts upward from an area below the front attachment portion of the assist grip towards the area below the rear attachment portion of the assist grip, wherein the shielding and inflating portion of the airbag further includes, in a lower portion in the area below the rear attachment portion of the assist grip, a second thickness regulating closing portion that is disposed at a distant from the lower edge side of the peripheral portion such that an inflatable portion is provided below the second thickness regulating closing portion, wherein the shielding and inflating portion of the airbag is configured such that, inflation thickness dimensions of the inflated portion below the front attachment portion and the inflated portion below the rear attachment portion of the assist grip are equal to each other, wherein the first thickness regulating closing portion includes a vertical rod portion and a horizontal rod portion that extends rearward from an upper end of the vertical rod portion, wherein the first thickness regulating closing portion is configured such that a rear end of the horizontal rod portion is disposed in an area directly below the front attachment portion of the assist grip at airbag deployment, wherein the shielding and inflating portion includes a front area that is disposed below the horizontal rod portion of the first thickness regulating closing portion, and a rear area that is disposed at the rear of the front area and above the second thickness regulating closing portion, the first thickness regulating closing portion not being disposed in the rear area, wherein the maximum thickness portion is set in such a curved shape that shifts upward increasingly toward the rear in an area from the front area to the rear area, wherein a width in a substantially vertical direction between the rear end of the horizontal rod portion of the first thickness regulating closing portion and the lower edge side of the peripheral portion in the front area is equal to a width in a substantially vertical direction between an upper edge side of the peripheral portion and the second thickness regulating closing portion in the rear area, and wherein the second thickness regulating closing portion includes a front portion that is connected with the lower edge side of the peripheral portion and extends obliquely rearward and upward from the lower side edge of the peripheral portion, and a rear portion that extends rearward from an upper end of the front portion at a distance from the lower edge side of the peripheral portion so that the inflatable portion is provided below the second thickness regulating closing portion.

2. The head protecting airbag device according to claim 1, wherein the airbag is configured such that, a connection port portion connected to an inflator for causing the inflation gas to flow into the airbag is disposed on an upper edge side of a substantially central portion of the airbag in the front-rear direction and above a rear edge side of the shielding and inflating portion on a rear side of the assist grip.

* * * * *